March 10, 1964 — R. N. ROWE — 3,124,403
ELECTRICAL BUS CONDUCTOR
Filed Dec. 21, 1960

INVENTOR.
RAYMOND N. ROWE
BY
ATTORNEY.

March 10, 1964 — R. N. ROWE — 3,124,403
ELECTRICAL BUS CONDUCTOR
Filed Dec. 21, 1960 — 2 Sheets-Sheet 2

INVENTOR.
RAYMOND N. ROWE
BY Charles A. McClure
ATTORNEY.

United States Patent Office 3,124,403
Patented Mar. 10, 1964

3,124,403
ELECTRICAL BUS CONDUCTOR
Raymond N. Rowe, Plainville, Conn., assignor to General Electric Company, a corporation of New York
Filed Dec. 21, 1960, Ser. No. 77,445
5 Claims. (Cl. 339—22)

This invention relates to electrical distribution systems, concerning especially bus conductors and cooperating stab connectors.

Many shapes of heavy-duty electrical conductors of bus type are known, from flat bus bars to conductors of variously channeled or other relatively complex shapes. The more involved bus shapes not only pose a problem of convenient insulation and support but also necessitate various types of probes or other electrical connectors for establishing conductive contact therewith. Low contact pressure and small effective contact area are conducive to high contact resistance and low current rating. Commonly used constructions are susceptible to misalignment, whether through inadequate bus support or improper co-operation with the probe or similar connector, giving rise to the mentioned and other difficulties.

A primary object of the present invention is improved conductive contact between an electrical probe and a bus conductor adapted to accommodate it.

An object is insulated supporting of a V-shaped bus conductor to accommodate a stab type of electrical probe.

A particular object is provision of a V-shaped bus conductor and a stab type of electrical probe constructed for effective conductive contact with one another.

Other objects of this invention, together with ways and means of attaining the various objects, will be apparent from the following description and the accompanying diagrams.

In general, the objects of the present invention are accomplished by means of a V-shaped stab and a relatively flexible V-shaped bus conductor adapted to accommodate the stab therein with the V-shaped stab exterior surface contiguous with the bus interior surface, the bus being adapted to assume a lesser V angle upon removal of the stab therefrom than when the stab is present therein. The invention comprehends surrounding the bus with an insulating jacket terminating in a plurality of flaps extending from opposite sides toward one another to form a V configuration with the apex thereof within the bus interior and contemplates supporting such bus conductors so insulated in a duct or busway by means of a plurality of generally plate-like bus supports having V-shaped indentations in an edge thereof to receive the jacketed assembly, with an overlying cover having apertures therein to admit stabs for contact with the bus.

Figure 1:
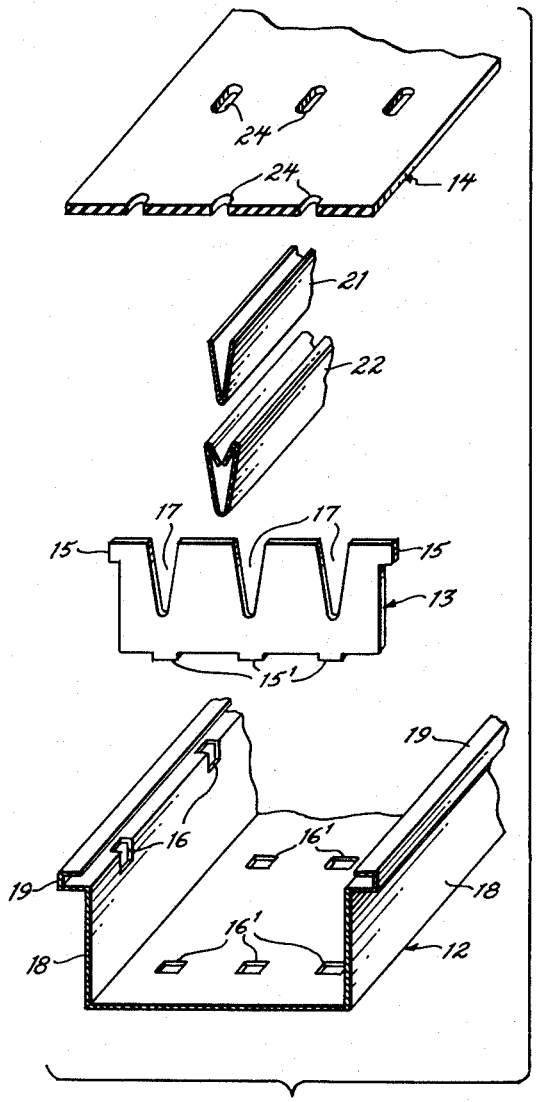
FIG. 1 is an exploded perspective view, partly in section, of a busway and associated elements according to the present invention.

FIG. 1 shows, in exploded perspective view, partly in section, a busway or duct comprising housing channel 12, cover 14, and bus support 13 in the form of a generally rectangular plate adapted to fit into the channel with its indented top edges flush with the tops of vertical side edges 18 of the housing. Integral tabs 15 extend from the side edges, and tabs 15' from the bottom edge, of the plate-like support to fit into corresponding slots 16 in the sides, and slots 16' in the bottom, of the channel. A plurality of such bus supports (of which only one is shown in this view) substantially close the channel transversely at spaced intervals therealong. Three V-shaped indentations 17 in the top edge of each bus support are adapted to receive correspondingly V-shaped bus conductors 21 (only one shown in this view) in parallel configuration, one in each indentation, with their rims flush with the top edge of the support. Insulating jackets 22 are adapted to surround the respective bus conductors, each jacket having closure flaps oriented inwardly from the bus rim in a V configuration with the apex thereof within the bus interior. Flat cover 14 is adapted to slide endwise into opposing channeled flanges 19, which adjoin the top edges of respective vertical sides 18 of housing 12, thereby covering the other elements mentioned and closing the busway, except that the ends of the housing may be open. When the cover is positioned as just described it not only helps to retain the bus supports in place in the housing but also retains the bus conductors in place in the V-shaped indentations in the bus supports. Rows of apertures 24 (some being shown only in part in this view) in the cover are aligned to provide access for electrical probes (not shown in this view) to the bus interior past the flaps of the jackets. For reasons that will become apparent, the bus supports are located between successive apertures or transverse rows of such apertures in the cover.

Figure 2:
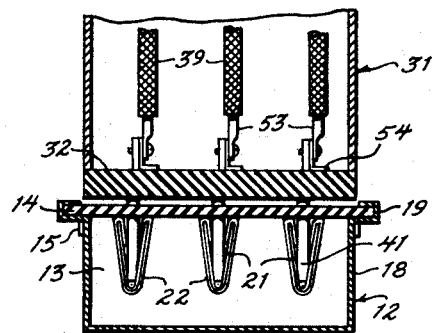
FIG. 2 is a sectional end elevation of a portion of the apparatus of the preceding view in conjunction with apparatus including electrical probes of stab type according to this invention.

FIG. 2 shows, in sectional end elevation, electrical probe asembly or block 31 with insulating cover 32 thereof juxtaposed opposite the outer face of cover 14 of the busway of FIG. 1. Stabs 41, protruding for a suitable distance from the block through openings 33 (not visible in this view) in the cover, extend through previously illustrated adjacent apertures in the busway cover, and pass between the respective pairs of flaps of the jacket and into the interior of respective bus conductors 21. Each stab is shown in contact with the adjacent interior bus surface near the apex thereof. Electrical leads 39, connected to the ends of the respective stabs enclosed in the block, are broken away (together with the rest of the block) as unessential to the showing of the invention. Details of the probe assembly appear in the next view.

Figure 3:
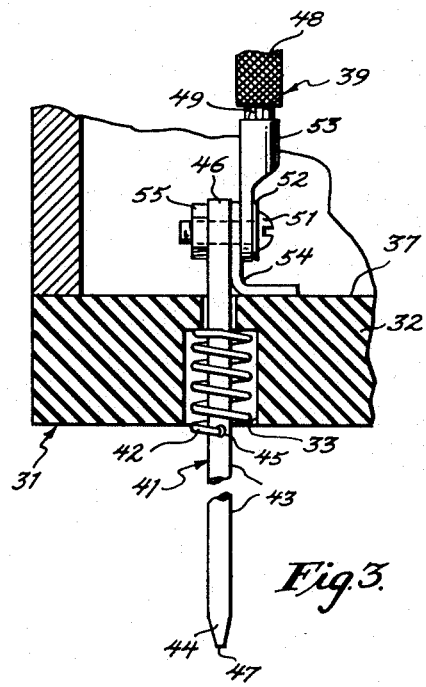
FIG. 3 is an end elevation, partly in section, of a portion of the apparatus of FIG. 2, somewhat enlarged.

FIG. 3 shows, also in end elevation and partly in section but enlarged, a single stab 41, like those of the preceding view, together with the immediately surrounding portion of block 31, including part of cover 32. It is apparent that exposed V-shaped end 44 of the stab is truncated, having terminus 47 perpendicular to shank 43, part of which is broken away in this view. Contiguous with one side of opposite end portion 46 of the stab is L-shaped stop member 54, with its laterally extending base abutting against flat interior surface 37 of the block cover alongside the inner end of opening 33 therein through which the stab extends. Lead 39 comprises conductive wire 49 covered by insulation 48 except near its end, which has connector 53 clinched on it; it is fastened to end 46 of the stab by screw 51, which passes first through washer 52, then the connector, the stop member, the stab end, and nut 55, in that order.

In both FIGS. 2 and 3 the stab is illustrated as biased to the fully protruding position, in which it is perpendicular to the face of insulating cover 32 of the block. The biasing in accomplished by means of spring 42, which surrounds stab shank 43 within recess-like enlarged outer portion of opening 33 in the block cover; the end of the spring nearer the exterior is pinned to the shank of the stab through aperture 45 therein, while the other end of the spring bears against the base of the recess. The stop member limits the protrusion of the stab and favors the indicated perpendicular orientation but without hindering minor angular displacement or tilting of the stab, as may occur in engagement with a slightly misaligned bus; of course, in fully engaged position a stab may be expected to be displaced inwardly of the supporting block, thereby compressing the biasing spring and forcing the base of the stop member away from the interior surface of the block cover.

Figures 4, 5, 6:
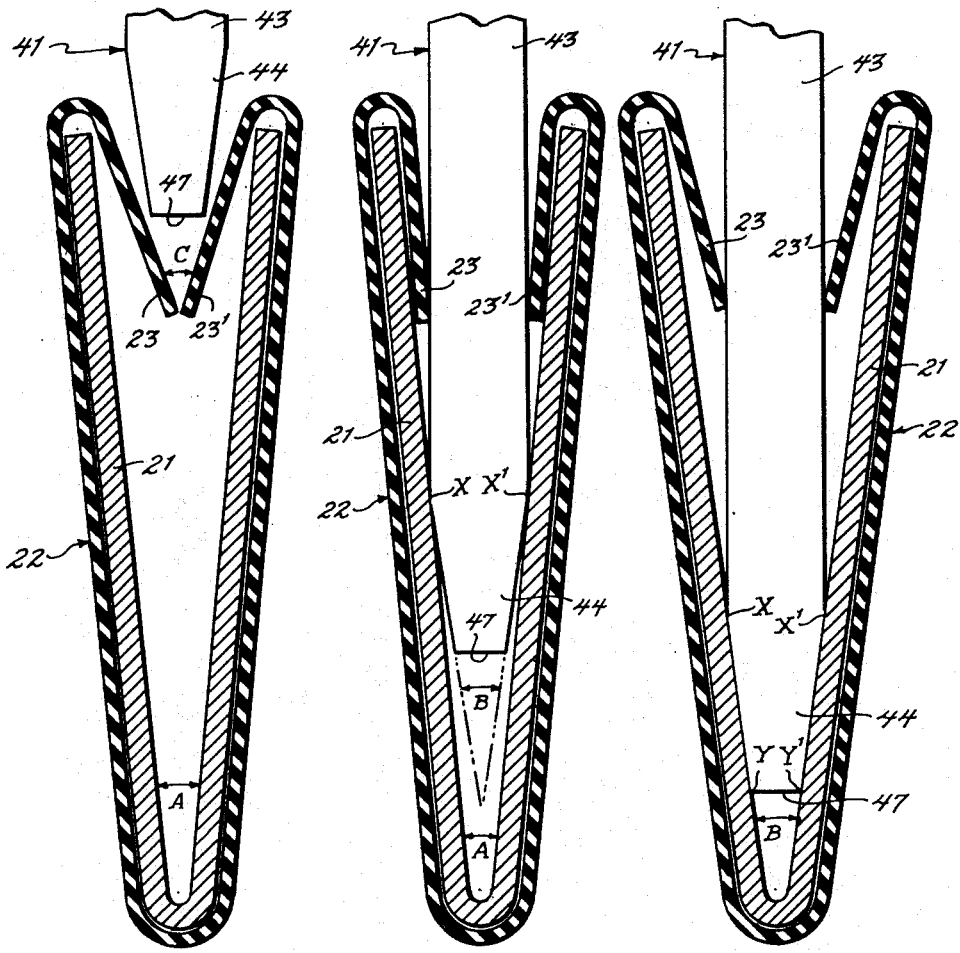
FIG. 4 is an enlarged setcional end elevation of a V-shaped bus conductor and V-shaped stab (in part) disassembled from one another.
FIG. 5 is a view similar to the immediately preceding view but with the stab and bus partly assembled to one another.
FIG. 6 is another similar view but showing the stab and bus in the fully assembled position.

FIGS. 4, 5, and 6 show, in sectional end elevation, the protruding end of stab 41 and bus conductor 21 (with surrounding insulating jacket 22) in successive positions of engagement of the bus by the stab. FIG. 4 shows a wholly disengaged position; FIG. 5 shows the stab partly engaged; and FIG. 6 shows the fully engaged position with substantial surface portions of the bus and stab contiguous with one another.

In FIG. 4, the visible portions of the stab include only truncated end 44 and an adjoining portion of shank 43, their longitudinal axis coinciding with the bisector (not shown) of interior angle A defined by the sides of the bus conductor viewed in transverse section. Flaps 23, 23' of insulating jacket 22 are oriented toward one another from the rim of the bus into terminal contact with one another in a V-shaped configuration, with the apex thereof within the bus interior and defining angle C. It is apparent that angle C is greater than angle A, and the relationship between the tapered stab end and angles A and C is more readily apparent upon consideration of the next view.

In FIG. 5 the junction of shank 43 and the tapered portion of truncated end 44 of the stab is just contiguous with the surface of the bus interior at locations X, X'. Flaps 23, 23' of insulating jacket 22 are spread apart between the stab and the adjacent inside bus surface, approaching angle A rather than previous flap angle C. Truncated end 44 of the stab subtends angle B, the tapered sides between shank 43 and perpendicular terminus 47 of the end coinciding with the sides (broken lines) of the angle. Angle A defined by the bus sides remains as in the preceding view, and it is clearly somewhat less than angle B subtended by the truncated stab end.

In FIG. 6 the stab has been forced into the bus conductor until the junction of the tapered portion with terminus 47 of truncated end 44 of the stab is contiguous, at Y, Y', with the inside surface of bus conductor 21, the opposite sides of which have spread to coincide with angle B as indicated. Thus, the stab and bus are in contact along opposite sides thereof between the junctions of the tapered portion of the truncated stab end with shank 43 and with the terminus itself, i.e., from X to Y and from X' to Y'. The ends of flaps 23, 23' of the insulating jacket remain in contact with the shank of the stab although the rest of the jacket has spread apart with the spreading of the bus itself. Location of the bus supports at locations other than where the stabs enter the bus conductors facilitates the mentioned expansion or spreading of the bus sides.

Figure 7:
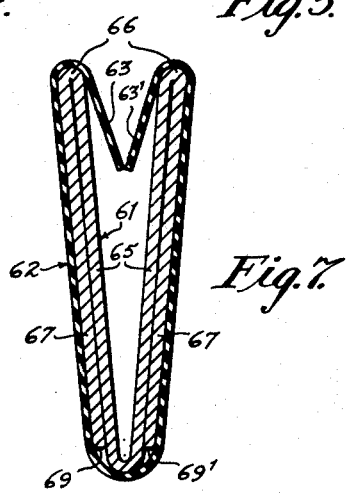
FIG. 7 is a sectional end elevation of a modified insulated bus conductor useful according to this invention.

FIG. 7 shows, in sectional end elevation, modified bus conductor 61 of this invention, which is V-shaped much like bus conductor 21 of the preceding views but distinguished therefrom by having a double-layered wall. The bus extends in single inside layer 65 on opposite sides from its apex to its rim 66 and reverses direction at the rim to continue in additional layer 67 outside and contiguous with the respective sides, finally terminating in end edges 69, 69' adjacent the apex formed by the inner layer. With each of the layers in this double-layered configuration as thick as the wall of the previous bus, this bus is characterized by substantially twice the current rating, as well as substantially the same flexibility (localized in the vicinity of the apex) and is useful similarly in conjunction with the stab type of connector previously described. Insulating jacket 62 (like previous jacket 22) surrounds the bus, with flaps 63, 63' positioned like the flaps of the previous bus with the stab removed.

The cooperation of stab and bus conductor, together with bus-insulating jacket, according to the present invention is especially apparent from the sequential showing of FIGS. 4, 5, and 6. The stab end being, at its greatest width, not so wide as the normal separation between opposite side edges of the bus conductor at its rim, is readily introduced therein. Upon continued movement of the stab toward the apex of the bus, opposite sides of the junction of the tapered portion of the stab end with the shank of the stab touch, and then slide, against the adjacent inside surface portions of the bus, spreading the sides of the bus and increasing the included angle. As soon as the bus begins to spread apart, the contact pressure increases, but continued insertion of the stab presents no problem, the force required being relatively low because of the sharpness of the angle and the flexibility of the bus. When the angle between the bus sides becomes identical with the angle subtended by the truncated end of the bus, the tapered portion of the stab end is contiguous with the inside surface of the bus at opposite sides, and the stab and bus are fully assembled. It will be apparent that further insertion of the stab after the fully assembled position is reached would require a great increase in force because of the abrupt relocation of the spreading force from the junction with the stab shank to the junction with the terminus itself, much closer to the bus apex.

A principal advantage of practicing this invention is high contact pressure between stab and bus without corresponding increase in the force required to assemble the one conductive member to the other. For optimum results the V angles of the respective members will be considerably acute and relatively close (preferably within several degrees) to one another, both preferably lying within the range of from about ten to twenty degrees. For example, a stab having a truncated end subtending an angle of thirteen degrees has proved quite satisfactory with a bus having an interior angle of ten degrees. The pressure (e.g., ten pounds) used to insert the stab provides four to five times as great a pressure at the portion thereof in contact with the bus. Some misalignment between stab and bus is tolerable because the spring-loaded stab readily comes into substantial alignment after encountering the bus interior surface.

Of course, the flaps of the insulating envelope covering the bus conductor prevent the entry of contaminants, while permitting ready insertion of stabs at intervals therealong. The flap angle is not critical but is determined largely by the interior angle of the bus and the dimensions of the bus and the stab, it being desirable that the flap length be somewhat less than the distance from the bus rim to the location on the interior surface at which the stab first touches the bus, with due allowance being made for possible shortening of that distance on one side or the other in the event of misalignment of the stab. The angle formed by the flaps should not be so large that withdrawal of the stab would tend to evert the flaps to an undesirable position outside the bus. Flap angles within the range of from about thirty to fifty degrees are generally suitable, subject to the mentioned considerations. A relatively stiff insulating material adapted to flex repeatedly at the bus rim is desirable as the flap composition; suitable materials include paper, such as fiber or fish paper, and other fibrous materials having the noted characteristics.

The housing channel for the busway may be made of either insulating or conductive material, whereas the bus supports and cover preferably are made of insulating material in view of their propinquity to the bus conductors. Suitable insulating materials, e.g., fiberboard, fiber-reinforced synthetic resins, ceramics or glass, will come readily to mind. When the bus supports and cover are non-conductive the insulating jacket may be dispensed with if its functions are not desired. The bus and stab members are composed of copper or other good electrical conductor, of course, and attachment of suitable flexibility of the bus and hardness of the stab is no problem in view of the advanced state of the art and for that reason will not be discussed here. The desired bus configuration may be attained by rolling, pressing, or stamping, for example. As the apex of the bus will be slightly curved, rather than quite sharp, the stab should be truncated sufficiently that its terminus does not encounter the relatively small curved apex portion of the bus.

Advantages and benefits of practicing the present invention have been mentioned above, and others will become apparent to those who undertake to practice it. Modifications in the illustrated and described embodiments may be made without relinquishing such advantages and benefits and without departing from the inventive concept, which is expressed in and circumscribed only by the following claims.

The claimed invention:

1. In an electrical distribution system, a flexible V-shaped bus conductor, a V-shaped stab having a V angle exceeding that of the bus but adapted to be inserted therein, and a covering for the bus opening comprising a plurality of flaps of insulating material disposed thereacross in a V configuration with the apex thereof within the interior of the bus, the V angle of the flap configuration exceeding the V angle of the stab.

2. In an electrical distribution system, a V-shaped bus conductor, adapted to receive a V-shaped stab therein, and an insulating jacket surrounding the bus and terminating in a plurality of flaps extending from opposite sides of the bus toward the interior thereof and toward one another to form a V configuration with the apex thereof within the bus, the V angle of the flap configuration exceeding the V angle of the bus.

3. In an electrical distribution system, an expansible V-shaped bus conductor adapted to receive therein a V-shaped stab having a greater V angle than the bus, the V angle of the bus with the stab therein conforming to the V angle of the stab, an insulating jacket of resilient material surrounding the bus and comprising a V-shaped body contiguous with the exterior of the bus and a plurality of flaps adjoining the body at the opening to the bus and extending therein and toward one another in a V configuration essentially free of contact with the bus interior in the absence of the stab therein.

4. In an electrical distribution system, a generally V-shaped bus conductor made from a single sheet and having double-layered walls, the terminating edges of the outer layer lying outside and adjacent the apex of the V on opposite sides thereof, the edges of the bus bordering the V opening constituting the junction of the outer and inner layers, the bus being sufficiently flexible to widen the angle of the V upon receiving therein a stab having a generally V-shaped end subtending such widened angle.

5. In an electrical distribution system, a stab contact including a solid contact end of generally V shaped truncated configuration having flat sides converging toward the truncation, said stab contact having also a shank portion with generally parallel flat sides joined to the sides of the contact end at the diverging ends of the latter sides, an elongated flexible bus conductor of generally V-shaped configuration adapted to receive said stab contact, said conductor having flat side walls spaced at their outer ends to provide an opening into which the stab contact is inserted, said side walls converging from their outer ends toward the inner ends thereof, said conductor including a base joining the side walls at their converging inner ends, the angle of the V formed by the sides of the contact end of the stab contact exceeding the angle of the V formed by the side walls of the conductor in the absence of the stab contact, the greatest thickness dimension of the contact end of the stab contact being less than the spacing between the outer ends of the side walls of the bus conductor, said stab contact when inserted into the bus conductor causing spreading of the side walls of the conductor by engagement of the junction lines of the walls of the contact end and of the shank portion with the side walls of the conductor, said stab contact when operatively positioned within the bus conductor having the sides of the contact end thereof generally parallel to and in planar engagement with the side walls of the bus conductor so that the V angle of the conductor conforms substantially to the V angle of the contact end of the stab contact, said stab contact being spaced from the base of the conductor when the stab contact is operatively positioned in the conductor, and an insulating covering for the opening of the bus conductor including insulating flaps disposed across the opening in a V configuration with the apex thereof within the conductor, the V angle of the flaps exceeding the V angle of the sides of the contact portion.

References Cited in the file of this patent

UNITED STATES PATENTS

| | | |
|---|---|---|
| 735,839 | Stiles | Aug. 11, 1903 |
| 1,018,334 | Murray | Feb. 20, 1912 |
| 1,167,474 | Benjamin | Jan. 11, 1916 |
| 1,961,484 | Grant | June 5, 1934 |
| 2,230,423 | Bassette et al. | Feb. 4, 1941 |
| 2,274,089 | O'Brien | Feb. 24, 1942 |
| 2,284,097 | La Jone | May 26, 1942 |
| 2,816,275 | Hammell | Dec. 10, 1957 |
| 2,979,686 | Longmire | Apr. 11, 1961 |
| 2,987,697 | Davis | June 6, 1961 |
| 2,992,401 | Lewis | July 11, 1961 |

FOREIGN PATENTS

| | | |
|---|---|---|
| 799,598 | Great Britain | Aug. 13, 1958 |